Nov. 17, 1953  J. A. MASON ET AL  2,659,830
COMBINED MOTOR AND CLUTCH
Filed Dec. 13, 1951  3 Sheets-Sheet 1
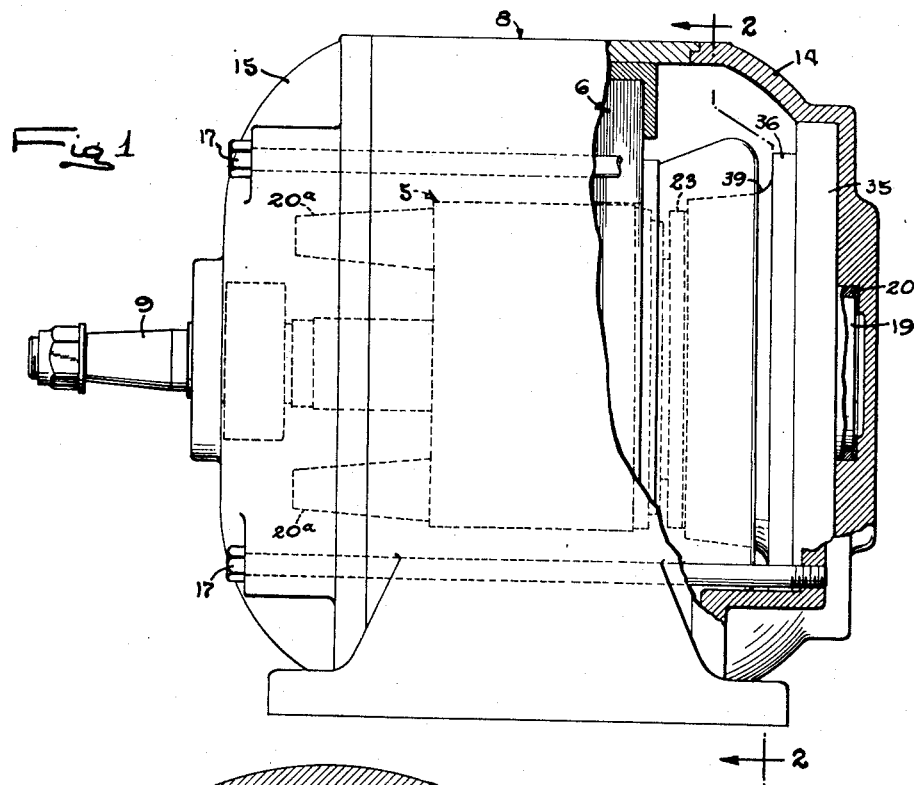
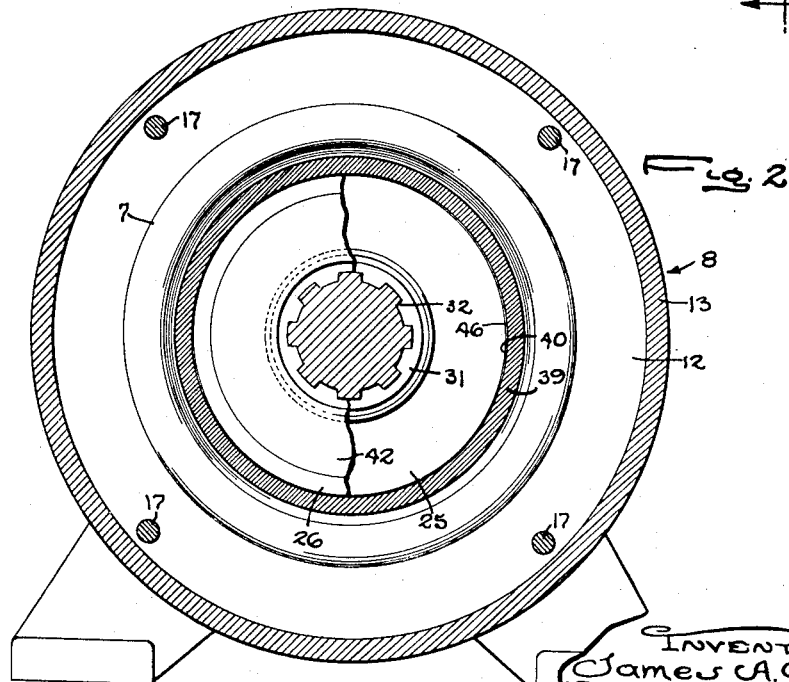

Nov. 17, 1953         J. A. MASON ET AL         2,659,830
COMBINED MOTOR AND CLUTCH
Filed Dec. 13, 1951                              3 Sheets-Sheet 2
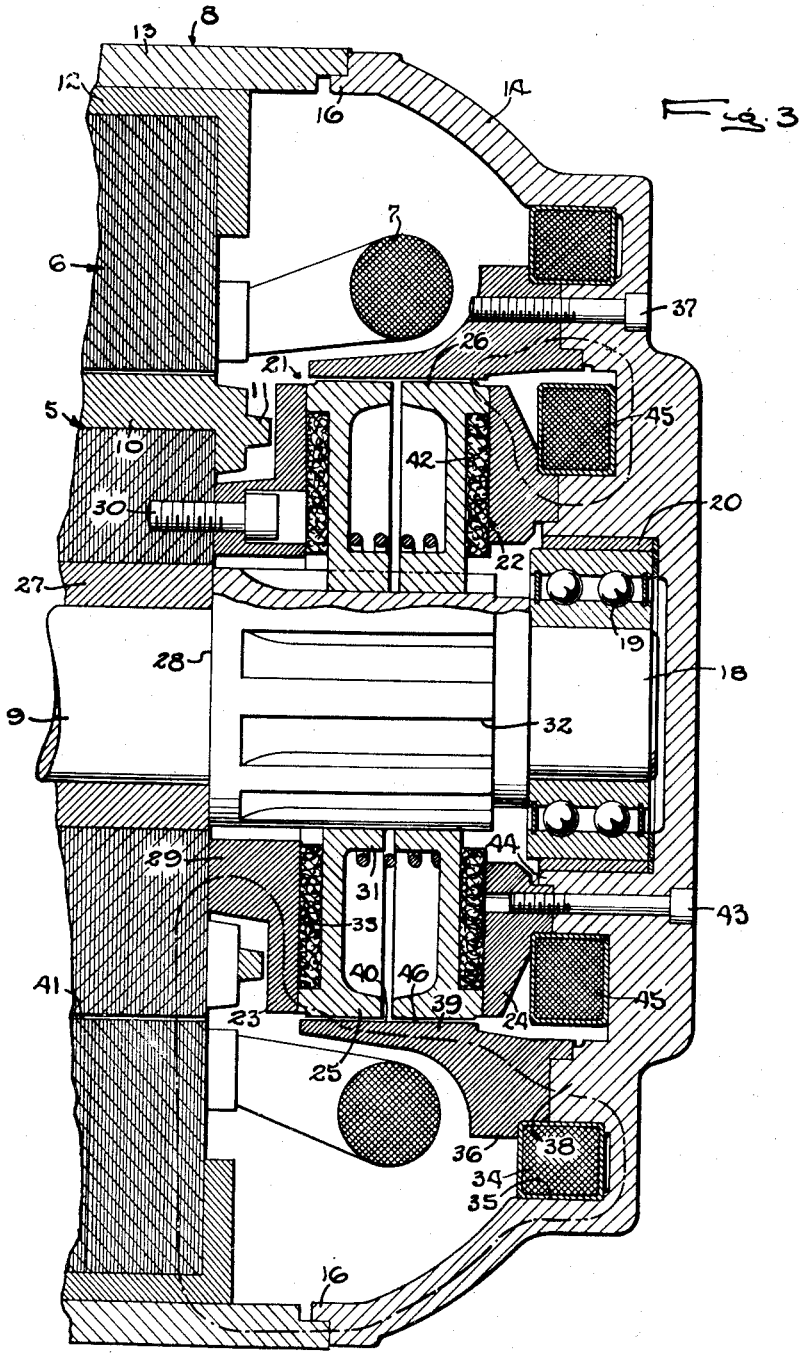

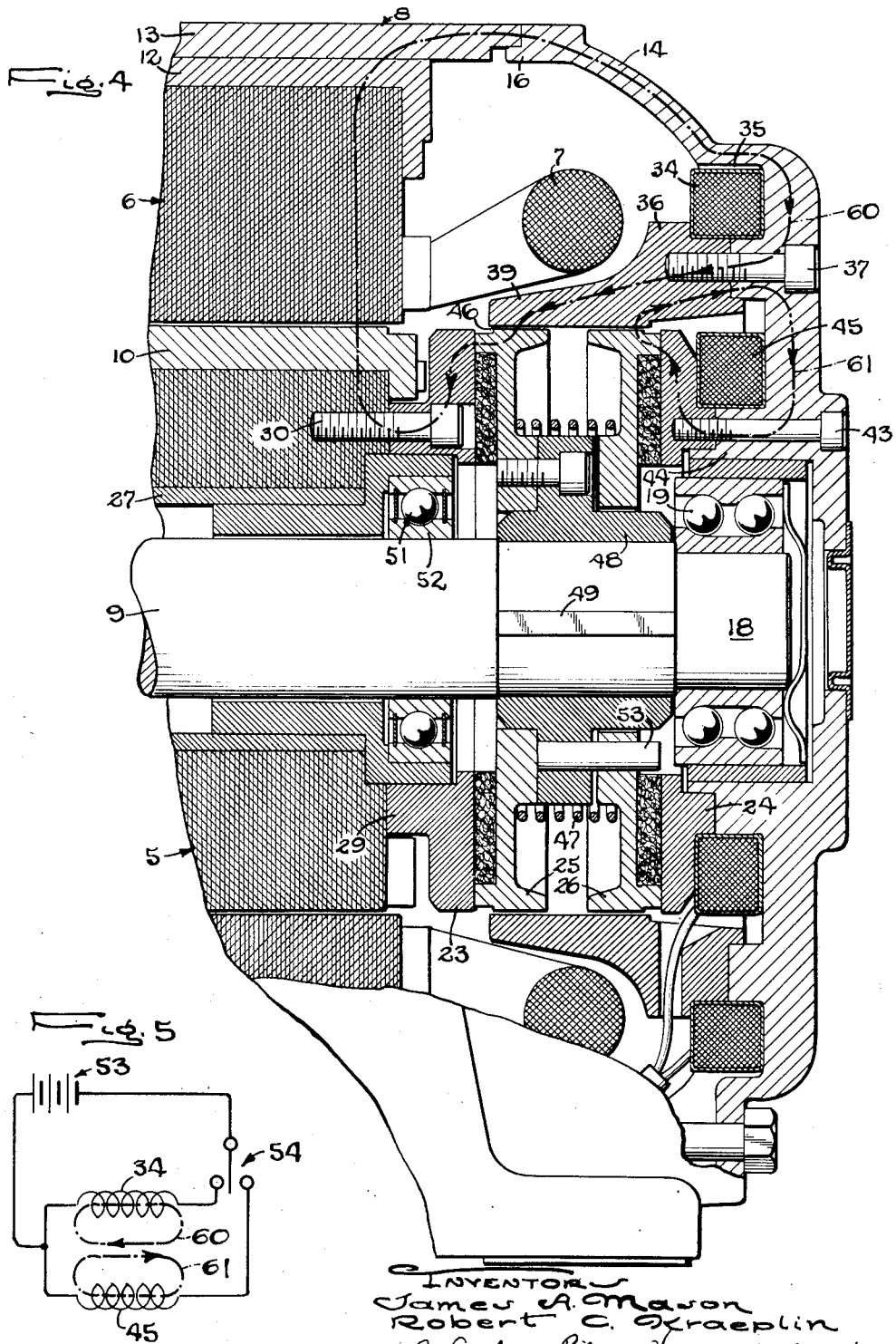

Patented Nov. 17, 1953

2,659,830

UNITED STATES PATENT OFFICE 2,659,830

COMBINED MOTOR AND CLUTCH

James A. Mason, Worcester, Mass., and Robert C. Kraeplin, Beloit, Wis., assignors to Warner Electric Brake & Clutch Company, South Beloit, Ill., a corporation of Illinois Application December 13, 1951, Serial No. 261,474

27 Claims. (Cl. 310—76)

The invention relates to an electric motor incorporating therein one or more electromagnetic friction devices for applying a driving or retarding torque to the output shaft of the motor.

One object is to incorporate two magnetic friction devices, one a clutch and the other a brake, within an electric motor housing without increasing the standard axial length of the latter.

Another object is to utilize the magnetic parts of the motor stator and rotor to form part of the magnetic flux circuit of a magnetic friction device disposed between the rotor and one end bell of the motor housing.

A further object is to arrange the driving and driven elements of the clutch and the brake in axially spaced relation between the rotor and end bell and extend the flux circuits of both devices through the iron of the bell and through a tubular projection extending inwardly therefrom.

Still another object is to extend the magnetic flux circuits for the brake and clutch through a common magnetic member while at the same time insuring proper dissipation of the residual magnetic flux following deenergization of either one of the devices.

A further object is to provide freedom of axial floating of the driving and driven clutch parts while mounting the latter rigid with the rotor and motor shaft.

The invention also resides in the novel arrangement of the parts of the friction devices to promote overall axial compactness, to take up wear at the friction surfaces automatically, to eliminate stray flux circuits, and to simplify the construction as a whole.

Other objects and advantages of the invention will become apparent from the following detailed description taken in connection with the accompanying drawings, in which:

Figure 1 is an elevational view of an electric motor of standard design incorporating a clutch and brake arranged in accordance with the present invention, one end portion of the motor housing being broken away and shown in section.

Fig. 2 is a section taken on the line 2—2 of Fig. 1.

Fig. 3 is an enlarged fragmentary diametrical sectional view through one end portion of the motor.

Fig. 4 is a view similar to Fig. 3 showing a modified form of the invention.

Fig. 5 is an electrical and flux circuit diagram.

While the invention is susceptible of various modifications and alternative constructions, we have shown in the drawings and will herein describe in detail the preferred embodiment. It is to be understood, however, that we do not intend to limit the invention by such disclosure but aim to cover all modifications and alternative constructions falling within the spirit and scope of the invention as expressed in the appended claims.

In the drawings, the invention is shown incorporated in an electric induction type motor of conventional design and dimensions comprising a squirrel cage rotor 5 and a laminated stator core 6 carrying windings 7 and supported in a housing 8 enclosing one end of the motor shaft 9 which projects from the opposite end of the housing for connection with the part to be driven. The rotor is laminated and carries inductor bars 10 and end rings 11 forming a squirrel cage winding.

Usually, the laminations of the stator core are held between flanges on a ring 12 pressed into the central cylindrical portion 13 of the housing 8. The windings 7 which encircle the stator poles project axially and outwardly from the stator and thus necessitate spacing of the housing end bells 14 and 15 a substantial distance from the end of the rotor. Fan blades 20ª projecting from one end of the rotor induce a flow of cooling air axially through the stator parts.

The inner open ends of the bells 14 and 15 are telescoped at 16 with the end of the housing cylinder 13 and the three parts are clamped together by the usual tie bolts 17. The bell 14 encloses a reduced portion 18 of the motor shaft which is journalled in a bearing 19 whose outer race ring is pressed into a bushing 20 of nonmagnetic material disposed in a cylindrical central recess end of the bell and extending around the outer end of the race ring. The other end portion of the shaft is journaled in a similar bearing in the other end bell and projects outwardly from the latter for connection with the part to be driven.

In one of its aspects, the present invention contemplates the incorporation within a standard motor housing of the above character of an electromagnetic friction clutch 21 for disengageably coupling the rotor to the shaft 9 and also a magnetic friction brake 22 for retarding the shaft, all of the parts of the clutch and brake being disposed in the limited space between the rotor and one end bell and within the projecting ends of the motor windings 7. In general, the necessary axial compactness is achieved by utilizing the motor housing 8 and the magnetic parts of the stator and rotor as part of the flux circuit of one or both of the two magnetic friction devices and by mounting the windings of both devices in a novel manner on one end bell, the bell 14 in this instance.

More specifically, the driving element 23 of the clutch and the non-rotatable member 24 of the brake are spaced apart axially and secured respectively to one end of the rotor and the opposed end bell 14, while the driven element 25 of the clutch and the rotary member 26 of the brake are disposed adjacent each other and carried by the intervening portion of the shaft 9. This arrangement of the clutch and brake parts within the closed end of the motor housing is made possible by journaling the rotor 5 loosely on the central portion of the shaft 9. To this end, the apertured rotor laminations are, in the form shown in Fig. 3, pressed onto a sleeve 27 rotatable on the central part of the shaft 9 between shoulders 28 by which the rotor is held against axial movement. The sleeve is composed of suitable non-magnetic bearing material such as bronze.

The driving clutch element 23 is a generally flat apertured disk of iron having an inner hub 29 secured as by countersunk cap screws 30 to the end of the stack of rotor laminations. The disk thus presents a flat outer surface for axial gripping engagement with the opposed face of the driven clutch element 25 whose hub 31 is, in the form shown in Fig. 3, loosely splined on a fluted portion 32 of the motor shaft. Segments 33 of wear resistant friction material are set in the disk 25 flush with the magnetic face of the disk.

The friction faces of the clutch disks are drawn into gripping engagement by energization of a multiple turn annular winding 34 which causes magnetic flux to thread axially through the outer peripheral portions of the two disks. To avoid the necessity of slip rings, the winding 34 is mounted stationarily in a cylindrical recess 35 cast in the outer part of the flat end portion of the end bell 14 being spaced axially from the ends of the motor windings 7 and disposed in the plane of the shaft bearing 19. The winding is held in place by an overlapping flange 36 clamped by cap screws 37 against a portion 38 of the end bell and formed around the outer end of a tubular projection 39 whose internal cylindrical surface 40 is concentric with the motor shaft and closely encircles the driven clutch disk 25 which is widened at its periphery to provide a large area of the narrow radial gap 46 through which flux may thread radially between the disk 25 and the projection 39.

The complete circuit for the magnetic flux created by energization of the winding 34 is of toroidal shape and each diametrical section thereof, indicated in phantom in the lower part of Fig. 3 and at 60 in Figs. 4 and 5, extends axially through the axially projecting flange 39, radially across the narrow gap 46 between the flange and the driving clutch disk 25, axially through the outer portions of the clutch faces, radially inwardly through the driving disk, axially through the flange 29 and the rotor laminations, outwardly through the rotor 5, the gap 41, the stator core 6 and into the housing shell 13, axially along the latter and the joint 16, and finally inwardly around the winding 34 through the outer periphery of the end bell to the end of the axially projecting flange 39. The flux thus threading through the axial faces of the clutch elements 23 and 25 at all points around the latter, draws the faces into axial gripping engagement causing a driving torque to be transmitted from the rotor 5 to the shaft 9.

The brake 22 is of the same general construction as the clutch, the rotary part 26 being a duplicate of the clutch disk 25 and loosely splined on the fluted part 32 of the shaft between the disk 25 and the bearing 19 so that its cylindrical periphery is similarly disposed close to the internal surface of the projection 39. Wear segments 42 are set in the inner part of the brake disk flush with the magnetic surface which is disposed opposite a flat face on the stationary brake member 24. The latter is an iron disk clamped by screws 43 against the end of a hub 44 on the end bell 14 supporting the sleeve 20. An annular winding 45 smaller in diameter than the clutch winding is disposed between the hub 44 and the rib 38 and is clamped by the brake disk 24 against the end wall of the bell 14.

A magnetic flux circuit of toroidal shape as indicated by the dot-dash outline in the upper part of Fig. 3 and at 61 (Figs. 4 and 5) thus encircles each part of the winding 45. The circuit extends from the tubular projection 39 inwardly across the radial gap 46 into the periphery of the brake disk 26, axially into the disk 24 and finally outwardly through the iron of the end bell and around the winding 45. When the latter is energized, the disks 24 and 26 are drawn into axial gripping engagement producing a retarding torque which is applied to the motor shaft and is of a magnitude corresponding to the degree of energization of the winding.

By arranging the gap 46 concentric with the clutch and brake elements 25 and 26, the width is not influenced by wearing off of the friction faces in service use. Any such wear at the axial faces is taken up automatically through the loose spline mounting of the disks 25 and 26 and the provision of means for maintaining these disks in continuous but light mechanical contact with the coacting axial fixed elements 23 and 24. Herein, this means comprises a compression spring 47 coiled around the hubs of the disks 25 and 26 and bearing at opposite ends against the opposed sides of the disks.

In installations where the motor is subjected to frequent starting and stopping or sudden load changes, it is desirable to fasten the driven clutch disk 25 rigidly to the shaft 9 as shown in Fig. 4 and mount the driving clutch element for free axial floating. For this purpose, the disk 25 may be bolted to a radial flange on a collar 48 abutting against a shoulder on the shaft 9 and secured to the latter by a key 49. In this modification, the rotor is supported on the shaft through end bushings 50 into which are pressed anti-friction bearings 51 whose inner race rings 52 are slidable axially along the intermediate portion of the shaft. As the clutch faces wear off in service, the rotor shifts along the shaft 9 thus permitting the clutch rings to engage properly in response to energization of the winding 34.

For certain applications, it is desirable to hold the clutch parts yieldable in light mechanical contact at least at the time when the clutch is energized. With the floating armature arrangement above described, this may be accomplished by so constructing the clutch parts and locating the shaft 9 initially that the rotor 5 of the motor will be disposed slightly off-center to the left relative to the stator as shown in Fig. 4. The rotor 5 tends to center itself in the stator when the latter is energized thus producing a small force which holds the driving clutch disk 23 in light mechanical contact with the disk 25 when the motor stator is energized as will always be the case when the clutch is to be engaged.

Axial floating of the rotary brake disk 26 is achieved by supporting the latter on angularly spaced pins 53 mounted in and projecting from the flange of the collar 40. As before, the spring 47 holds the rotary brake disk against the stationary disk 24 thus taking up wear at the brake surfaces.

The energization of the clutch and brake windings 34 and 45 from a direct current source such as a battery 53 may be controlled in any suitable way as by a double throw switch 54 and, if desired, may be timed automatically with the application and interruption of current to the motor windings 7. When the motor is running with the windings 34 and 45 deenergized, the rotor 5 and its supporting bushing 27 turn on the shaft 9 which remains stationary until the clutch is energized. The driving clutch disk 23 turns with the rotor so that a torque will be applied to the shaft when the winding 34 is energized causing the two disks 23 and 25 to grip each other. The brake disk 26 turns with the shaft on which a retarding torque will be exerted when the winding 45 is energized which usually takes place after disengagement of the clutch. The motion of the shaft and the parts driven thereby may thus be arrested quickly without the necessity of overcoming the energy of the rotating rotor.

The invention also contemplates arrangement of the brake and clutch windings 34 and 45 and connection of the same to the current source 53 in a novel manner such that the magnetic flux produced by energizing one of the windings threads the common portion 39 of the two flux circuits 60 and 61 in a direction opposite to that of the flux in the other circuit when current is applied to the other winding. This relationship is achieved by winding the coils 34 and 45 in the same direction and by connecting their adjacent terminals to one terminal of the source 53, the other terminals being connectable to the other power lead by selective closure of the switches 54. With these connections, the clutch flux may, as indicated in Fig. 4, thread the circuit 60 in a counterclockwise direction, the brake flux traversing the path 61 clockwise when the winding 45 is energized. It will be observed that the directions of the flux in the common part 39 of the two circuits are opposite.

The residual magnetic flux which tends to persist in each circuit after interruption of the current flow in the corresponding winding follows the same path and is in the same direction as the main flux. Owing, however, to the fact that the direction of the main flux in either circuit is opposite to that of the residual flux remaining after deenergization of the other winding, the residual flux is quickly neutralized instead of being augmented. As a result, there is no tendency for the brake to drag under the influence of residual flux when the clutch winding 34 is energized. Similarly, the clutch is completely released by neutralization of its residual flux when the brake winding is energized following deenergization of the clutch winding.

It will be observed that both the clutch 21 and the brake 22 have been built into the motor housing without increasing the axial dimensions thereof and without in any way detracting from the efficiency of the motor. All of this has been achieved through the inclusion of the iron parts of the motor in the magnetic flux circuits of the clutch and brake, the use of stationary windings to avoid the necessity of slip rings, and by the novel arrangement of the clutch and brake parts in relation to the rotor, the stator windings and the end bell 14. At the same time, a minimum number of changes in the construction of the motor parts is required, these being in the shaft 9 and the end bell 14.

Those parts 23 and 24 of the clutch and brake which are subject to wear and may require replacement after prolonged service use are readily removable with the construction above described. To replace the brake part 24, it is only necessary to remove the screws 43 after removal of the motor end bell 14, the detached part being withdrawn axially through the tubular member 39. The armature elements 25 and 26 may be slid endwise off from the shaft keys following removal of the end bell. The screws 30 are then accessible to permit removal and replacement of the clutch part 23.

We claim as our invention:

1. The combination of, an electric motor having a stator core, a magnetic housing with an end bell, a shaft journaled in said bell and a rotor journaled on said shaft to turn relative thereto, inner and outer disks rotatable with said shaft and disposed between said rotor and end bell, a magnetic tubular projection rigid with said bell and spanning the peripheries of said disks, clutch and brake windings supported by said end bell exteriorly and interiorly of said projection, an annular magnetic member secured to said bell for axial gripping engagement with said outer disk to form a friction brake and completing a magnetic flux circuit encircling each portion of said brake winding and extending successively through said bell, said member, said outer disk and said projection, and an annular magnetic element secured to the end of said rotor adapted for axial gripping engagement with said inner disk to form a friction clutch and completing a flux circuit extending around each portion of said clutch winding and successively through said element, said projection, said end bell, said motor core and said rotor.

2. The combination of, an electric motor having a stator core, a rotor, and a magnetic housing with an end bell, a shaft journaled in said bell, inner and outer magnetic disks rotatable with said shaft and disposed between said rotor and end bell, a magnetic tubular projection rigid with said bell and spanning the peripheries of said disks, clutch and brake windings supported by said end bell exteriorly and interiorly of said projection, an annular magnetic member secured to said bell for axial gripping engagement with said outer disk to form a friction brake and complete a magnetic flux circuit encircling each portion of said brake winding and extending successively through said bell, said member, said outer disk and said projection, and an annular magnetic element on the end of said rotor adapted for axial gripping engagement with said inner disk to form a friction clutch and complete a flux circuit extending around each portion of said clutch winding and successively through said element, said projection, said end bell, said motor core and said rotor.

3. The combination of, an electric motor having a stator core, a rotor, and a magnetic housing with an end bell, a shaft journaled in said bell, a magnetic friction clutch adjacent said rotor having an annular winding secured to said bell and having axially engageable driving and driven elements respectively secured to the end of said rotor and to said shaft, a magnetic friction brake between said clutch and said bell having an annular winding secured to said bell within said clutch winding and axially engageable elements respectively secured to said bell and said shaft, and an annular magnetic member secured to said end bell concentric with and spanning said driven clutch element and the rotatable brake element and completing a flux circuit through said driving and driven elements and end bell and around each part of said brake winding and a separate flux circuit through said bell and brake elements, said stator core and said rotor and around each part of said clutch winding.

4. The combination of, an electric motor having a stator core, a rotor, and a magnetic housing with an end bell, a shaft journaled at one end in said bell, a friction clutch having an annular winding secured to said bell and axially engageable magnetic elements one secured to said rotor and the second rotatable with said shaft, a friction brake having an annular winding secured to said bell within said clutch winding and axially engageable magnetic members one secured to said end bell and the other rotatable with said shaft adjacent said second clutch element, and a tubular magnetic projection rigid with said end bell between said coils and extending axially and inwardly across the outer peripheries of said driven clutch element and the rotatable brake member, said projection completing two flux circuits each including said end bell and one encircling said clutch coil and extending through said magnetic elements and the gap between said stator core and said rotor the other of said flux circuits extending through said brake members.

5. The combination of, an electric motor having a stator core, a rotor, and a magnetic housing with an end bell, a shaft journaled in said bell, a friction clutch having an annular winding secured to said bell and axially engageable magnetic elements one secured to said rotor and the second rotatable with said shaft, a friction brake having an annular winding secured to said bell and axially engageable magnetic members one secured to said end bell and the other loosely splined on said shaft adjacent said second clutch element, and a magnetic part rigid with said end bell and encircling said driven clutch element and the rotatable brake member, said part completing two magnetic flux circuits through said end bell and said elements and members and respectively encircling each angular portion of said clutch and brake coils and one extending radially through said stator core and said rotor.

6. The combination of, an electric motor having a stator core, a rotor, and a magnetic housing with an end bell, a shaft journaled in said bell, a friction clutch having an annular winding secured to said bell and axially engageable magnetic elements one secured to said rotor and the second rotatable with said shaft, a friction brake having an annular winding secured to said bell and axially engageable magnetic members one secured to said end bell and the other rotatable with said shaft adjacent said second clutch element, a magnetic part rigid with said end bell and encircling said driven clutch element and the rotatable brake member, said part completing two magnetic flux circuits through said end bell and said elements and members respectively and respectively encircling each angular portion of said clutch and brake coils and one extending radially through said stator core and said rotor, and spring means yieldably urging said driven clutch element and said rotatable brake member apart.

7. The combination of, an electric motor having a stator core, a rotor, and a magnetic housing with an end bell, a shaft journaled in said bell, a friction clutch having an annular winding and axially engageable magnetic elements mounted on said rotor and said shaft respectively, a friction brake having an annular winding and axially engageable magnetic members mounted on said end bell and said shaft respectively, and magnetic means completing magnetic flux circuits through said end bell and said elements and members respectively and respectively encircling each section of the clutch and brake windings and one extending through the gap between said stator core and said rotor.

8. The combination of, an electric motor having a stator core, a rotor, and a magnetic housing, a shaft journaled in said housing, a friction clutch having an annular winding and axially engageable magnetic elements respectively rotatable with said rotor and said shaft, a friction brake having an annular winding and axially engageable magnetic members respectively secured to said housing and said shaft, and magnetic means completing two magnetic flux circuits through said housing and said elements and members respectively and one extending through the gap between said stator core and said rotor.

9. The combination of, an electric motor having a stator core, a rotor, a magnetic housing with an end bell, a shaft journaled therein, two electromagnetic friction devices axially spaced along said shaft between said rotor and said bell and having annular windings respectively energizable to couple said rotor and said shaft and to retard the latter, and magnetic means completing magnetic flux circuits around the respective windings and through magnetic parts of said housing and said friction devices, one of said flux circuits extending through the gap between said stator core and said rotor.

10. The combination of an electric motor having a stator core with field coils projecting axially therefrom, a rotor, and a magnetic housing with an end bell, a shaft journaled in said bell, a magnetic friction clutch axially spaced from said rotor, an annular winding energizable to couple said rotor to said shaft, a magnetic friction brake having an annular winding energizable to cause a retarding torque to be applied to said shaft, said clutch and brake windings being concentric with each other and mounted on said end bell substantially in a common plane disposed outwardly beyond the ends of said field coils, and magnetic means completing separate flux circuits through said end bell and the magnetic parts of said clutch and brake respectively and extending around each part of each of the respective windings.

11. The combination of, an electric motor having a housing including bells at opposite ends, a shaft journaled in said end bells, a rotor, a stator fitting in said housing and having field windings projecting axially toward said end bells and overhanging the ends of said rotor to provide a cup shaped recess around said shaft and within the windings, two annular magnetic windings stationarily mounted on one of said end bells and encircling said shaft, a magnetic friction clutch having axially engageable magnetic rings disposed within said recess and respectively rotatable with said rotor and said shaft, means providing a toroidal flux path encircling each portion of one of said windings and extending axially through said clutch rings, a magnetic friction brake comprising two magnetic rings adapted for axial gripping engagement and respectively supported on said shaft and said one end bell, and means providing a toroidal flux path encircling each portion of the other of said windings and extending axially through said second rings.

12. The combination of an electric motor having a stator core, a rotor, and a magnetic housing with an end bell, a shaft journaled in said bell, a magnetic friction clutch adjacent said rotor having an annular winding secured to said bell and having axially engageable driving and driven elements respectively secured to said rotor and said shaft, and an annular magnetic member secured to said end bell concentric with and spanning said driven clutch element and completing a magnetic fluix circuit extending axially through said elements and the member, outwardly around said winding, and finally inwardly through said startor core and said rotor.

13. The combination of an electric motor having a stator core, a magnetic housing with an end bell, a shaft journaled in said bell, and a rotor journaled on said shaft to turn relative thereto, a magnetic friction clutch adjacent said rotor having an annular winding and axially engageable driving and driven magnetic elements respectively secured to the end of said rotor and to said shaft, and magnetic means completing a magnetic flux circuit around each part of said winding and extending through said end bell, said elements, and the gap between said stator core and said rotor.

14. The combination of an electric motor having a stator, a rotor, a magnetic housing for said stator including an end bell, a shaft journaled in said end bell and projecting axially through said rotor for free rotation relative thereto, bearings supported by said shaft and supporting said rotor for axial floating movement relative to the shaft, an electromagnetic friction clutch comprising driving and driven magnetic rings respectively secured to said rotor and said shaft at one end of the rotor, and a multiple turn winding mounted on said end bell and adapted when energized to draw said rings into axial gripping engagement, said rotor, when said clutch rings are in engagement with each other being disposed off-center relative to said stator in a direction away from said clutch whereby the tendency of said rotor to center itself in the stator when the latter is energized holds said rings in engagement with each other.

15. The combination of an electric motor having a stator, a rotor, a magnetic housing including an end bell, a shaft journaled in said end bell and projecting axially through said rotor for free turning relative thereto, bearings supported by said shaft and supporting said rotor for axial floating movement relative to the shaft, an electromagnetic friction clutch comprising driving and driven magnetic rings respectively secured rigidly to said rotor and said shaft at one end of the rotor, and a multiple turn winding mounted on said end bell and adapted when energized to draw said rings into axial gripping engagement.

16. The combination of, a motor end bell in the form of a disk of magnetic material having an annular flange projecting axially from one side of the bell and spaced inwardly from the outer periphery thereof, said flange having an internal cylindrical surface concentric with the axis of said bell, two axially spaced magnetic rings concentric with the axis of said disk and disposed within said flange with their peripheries disposed closely adjacent said cylindrical surface, two multiple turn annular coils respectively mounted on said bell within and outside of said flange, means on said disk cooperating with the adjacent one of said rings to provide an electromagnetic friction brake having a flux circuit of toroidal form encircling the inner one of said coils and extending through said member, said bell, said flange and said one ring, and a magnetic friction clutch engaged by energization of said outer coil and including a magnetic driving element adapted for axial gripping engagement with the other of said rings and forming part of a magnetic flux circuit extending axially with said other ring, outwardly into said flange, and then outwardly through said bell and around said outer coil.

17. The combination of, an end bell of magnetic material having an annular flange projecting axially therefrom, inner and outer annular multiple turn windings mounted on said bell inside and outside of said flange, axially spaced magnetic rings fitting within said flange, said bell and the adjacent one of said rings cooperating to form a magnetic friction brake having a toroidal flux path encircling each part of said inner winding, and a magnetic friction clutch including a driven member of magnetic material disposed on the side of said adjacent ring remote from said bell and adapted for axial gripping engagement with said other ring, said driving member comprising part of a toroidal magnetic flux path extending through said other ring, said flange, and outwardly through said bell around said outer winding.

18. The combination of, an end bell for a motor, a shaft journaled therein and projecting axially thereof, a pair of axially spaced magnetic rings rotatable with said shaft, a cylindrical magnetic flange projecting axially from said bell and closely surrounding the peripheries of both of said rings, two annular windings mounted on said end bell inside and outside of said flange, said bell having a friction surface adapted for axial gripping engagement with the adjacent one of said rings to form a magnetic brake, and a driving clutch member disposed beyond the end of said flange and adapted for axial gripping engagement with said other ring to form a magnetic clutch, said clutch and said brake having magnetic flux circuits each extending axially through said flange.

19. The combination of, an end bell for a motor, a shaft journaled therein and projecting axially thereof, a magnetic ring rotatable with said shaft about the axis of said bell and axially spaced inwardly therefrom, an annular winding stationarily mounted on said end bell, a driving clutch element encircling said shaft and adapted for axial gripping engagement with said ring to form a magnetic clutch adapted to be engaged by energization of said winding, and an annular magnetic member projecting from said bell and having an internal surface closely encircling said ring but extending short of said element, said member constituting part of a magnetic flux path of toroidal shape extending axially between said element and ring, outwardly into said member and then axially through said member, and finally radially outwardly around said winding and through said bell to the outer periphery thereof.

20. The combination of, an electric motor having a housing including bells at opposite ends, a shaft journaled in said end bells, a rotor, a stator fitting in said housing and having field windings projecting axially toward said end bells and overhanging the ends of said rotor to provide a cup shaped recess around said shaft and within the windings, an annular magnetic winding stationarily mounted on one of said end bells and encircling said shaft, a magnetic ring rotatable with said shaft and disposed within said recess, a driving clutch element disposed in said recess between said ring and said rotor and rotatable with said rotor, said element being adapted for axial gripping engagement with said ring, and means coacting with said one end bell and providing a toroidal flux path encircling each portion of said winding and extending axially through said ring and said element, said last mentioned means including a magnetic member projecting from said one end bell toward and into said recess.

21. The combination of, an electric motor having a housing including bells at opposite ends, a shaft journaled in said end bells, a rotor, a stator fitting in said housing and having field windings projecting axially toward said end bells and overhanging the ends of said rotor to provide a cup shaped recess around said shaft and within the windings, an annular magnetic winding stationarily mounted on one of said end bells and encircling said shaft, two magnetic rings disposed within said recess and adapted for axial gripping engagement, means coupling one of said rings to said shaft for rotation therewith, and means coacting with said one end bell and providing a toroidal flux path encircling each portion of said winding and extending axially through said rings, said last mentioned means including a magnetic member projecting inwardly from said one end bell beyond one of said rings to form therewith a narrow radial gap.

22. The combination of, an electric motor having a housing including bells at opposite ends, a shaft journaled in said end bells, a rotor, a stator fitting in said housing and having field windings projecting axially toward said end bells and overhanging the ends of said rotor to provide a cup shaped recess around said shaft and within the windings, an annular magnetic winding encircling said shaft, magnetic rings encircling said shaft and disposed within said recess, said rings being adapted for axial gripping engagement and coacting to form a friction clutch, means coupling one of said rings to said shaft, and means providing a toroidal flux path encircling each portion of said winding and extending axially through portions of said rings disposed within said recess and the outer ends of said windings whereby to draw the rings into axial gripping engagement when said winding is energized, said last mentioned means including a magnetic member rigid with said one end bell and telescoping closely with one of said rings.

23. The combination of, a motor end bell of magnetic material having an annular flange projecting axially from one side of the bell and spaced inwardly from the outer periphery thereof, said flange having an internal cylindrical surface concentric with the axis of said bell, two axially spaced magnetic rings concentric with the bell axis and disposed within said flange with their peripheries disposed closely adjacent said cylindrical surface, two multiple turn annular coils of different diameters mounted on said bell within and outside of said flange, a member rigid with said bell and cooperating with the adjacent one of said rings to provide an electromagnetic friction brake having a flux circuit of toroidal form encircling the inner end of said coils and extending through said member, said bell, said flange, and said one ring, and a magnetic friction clutch engaged by energization of said outer coil and including a magnetic driving element adapted for axial gripping engagement with the other of said rings and forming part of a magnetic flux circuit extending axially with said other ring, outwardly into said flange, axially along the latter, and then outwardly through said bell around said outer coil, and mechanism for energizing the brake and clutch coils selectively to produce magnetic flux threading through said flange in one direction when the clutch coil is energized and in the reverse direction during energization of said brake coil.

24. The combination of, an end bell of magnetic material having an annular flange projecting axially therefrom, annular multiple turn windings mounted on said bell inside and outside of said flange, axially spaced magnetic rings fitting within said flange, a magnetic member rigid with said bell and cooperating with the adjacent one of said rings, said flange, and said bell to form a friction brake and a toroidal flux path encircling each part of said inner winding, a magnetic friction clutch including a driven member of magnetic material disposed on the side of said ring remote from said bell and adapted for axial gripping engagement with said other rings, said driving member comprising part of a toroidal magnetic flux path extending through said other ring, said flange, and outwardly through said bell around said outer winding, and means for energizing said windings selectively to produce magnetic flux flows in opposite directions through said flange and along said paths when the respective windings are energized.

25. The combination of, an end bell for a motor, a shaft journaled therein and projecting axially thereof, a pair of axially spaced magnetic rings rotatable about the axis of said bell, two annular windings of different diameters mounted on said end bell, said bell having a friction surface adapted for axial gripping engagement with the adjacent one of said rings to form a magnetic brake adapted to be applied by energization of one of said windings, a driving clutch member adapted for axial gripping engagement with said other ring to form a magnetic clutch adapted to be engaged by energization of the other of said windings, said clutch and said brake having magnetic flux circuits encircling the respective windings and extending through said end bell and a common part encircling said rings, and means for energizing said windings selectively to produce flux flows in opposite directions through said common magnetic part.

26. The combination of, an end bell for a motor, a shaft journaled therein and projecting axially thereof, a pair of axially spaced rings rotatable about the axis of said bell, two annular windings mounted on said end bell, said bell having a friction surface adapted for axial gripping engagement with the adjacent one of said rings to form a magnetic brake adapted to be applied by energization of one of said windings, a driving clutch member adapted for axial gripping engagement with said other ring to form a magnetic clutch adapted to be engaged by energization of the other of said windings, said clutch and said brake having magnetic flux circuits encircling the respective windings and extending through said end bell and a common magnetic part encircling said rings, and means for energizing said windings selectively to produce flux flows in said circuits and in opposite directions through said common magnetic part.

27. The combination of, an electric motor having a stator coil, a rotor, a magnetic housing including an end bell, a shaft journaled in said end bell and projecting axially through said stator, bearings supported by said shaft and supporting said rotor for axial floating movement, an electromagnetic friction clutch comprising driving and driven magnetic rings respectively secured rigidly to said rotor and said shaft at one end of the rotor, an electromagnetic friction brake adapted when energized to apply a retarding torque including a stationary ring rigid with said end bell and a ring adapted for axial gripping engagement with said stationary ring, and means on said driving clutch ring supporting said last mentioned brake ring for rotation with said shaft but for free axial floating relative thereto.

JAMES A. MASON.
ROBERT C. KRAEPLIN.

References Cited in the file of this patent

UNITED STATES PATENTS

| Number | Name | Date |
|---|---|---|
| 1,665,742 | Kingston | Apr. 10, 1928 |
| 2,314,019 | Shaw | Mar. 16, 1943 |
| 2,489,365 | Broussouse | Nov. 29, 1949 |

FOREIGN PATENTS

| Number | Country | Date |
|---|---|---|
| 635,025 | Germany | Sept. 9, 1936 |